United States Patent [19]

Faroudja

[11] 3,882,539

[45] May 6, 1975

[54] METHOD AND APPARATUS FOR IMPROVED SKIP FIELD RECORDING

[76] Inventor: Yves C. Faroudja, 26595 Anacapa Dr., Los Altos Hills, Calif. 94022

[22] Filed: Feb. 12, 1973

[21] Appl. No.: 331,785

[52] U.S. Cl. .................................. 360/11; 178/6.7 A
[51] Int. Cl. .................................................. H04n 5/76
[58] Field of Search...... 178/DIG. 24, DIG. 28, 5.4 CD, 178/6.6 SR, 6.7 A; 360/11

[56] References Cited

UNITED STATES PATENTS

| | | | |
|---|---|---|---|
| 2,517,797 | 8/1950 | McFarlan | 178/DIG. 28 |
| 3,193,619 | 7/1965 | Sennhenn | 178/DIG. 24 |
| 3,196,207 | 7/1965 | Davies | 178/DIG. 24 |
| 3,582,543 | 6/1971 | Davies et al. | 178/DIG. 24 |
| 3,609,228 | 9/1971 | Goldmark et al. | 178/5.4 CD |
| 3,676,585 | 7/1972 | Kaneko et al. | 178/DIG. 24 |
| 3,702,896 | 11/1972 | Kurahashi et al. | 178/5.4 CD |
| 3,716,664 | 2/1973 | Dubbe | 178/5.4 CD |
| 3,752,906 | 8/1973 | Lowry | 178/5.4 CD |

FOREIGN PATENTS OR APPLICATIONS

| | | | |
|---|---|---|---|
| 1,022,472 | 3/1966 | United Kingdom | 178/DIG. 24 |

*Primary Examiner*—Robert L. Richardson
*Assistant Examiner*—Mitchell Saffian
*Attorney, Agent, or Firm*—Lowhurst, Aine & Nolan

[57] ABSTRACT

A method and apparatus is disclosed for use in connection with a skip field recording system in which sequential fields are combined to form a composite field which composite field is then processed in the conventional manner. The field combining is done, for example, by use of a storage type pick-up tube which is exposed to a first field image and then to a second field image without an intervening discharge of the storage tube. The information then read out of the storage tube is the sum or combination of the information contained in both fields. Composite field signals formed in this manner are then recorded in the conventional manner of skip field recording.

19 Claims, 4 Drawing Figures

Tx 5045
X 5055

METHOD AND APPARATUS FOR IMPROVED SKIP FIELD RECORDING

BACKGROUND OF THE INVENTION

It is known to use what is known as skip field recording to record video information. In skip field recording, only one out of a predetermined number of consecutive television fields is recorded with the result that significantly less magnetic tape is required. Generally, only one out of three consecutive television fields is recorded ("skip-2" recording) although in some cases every other field is recorded ("skip-1" recording). Thus, in a 60 Hz standard, only twenty fields are recorded every second. Each recorded field is played back three times, thus reconstituting a fair approximation of the original material. However, such a recording and playback scheme has a number of disadvantages. First, the playback is subject to motion discontinuity or staccato. If the source is a live material, or a tape of a live source, then the playback display is, in effect, equivalent to a 20 frame per second system as far as motion is concerned. The effect is generally not too objectionable, but for rapid motion sometimes leads to a visible movement discontinuation. When, however, the program source is a film, moving, for example, at 24 frames per second, the problem of motion discontinuity is much more serious, because one out of six images of the original film is lost during transfer. This can be seen from the fact that the film chain generates 60 television fields per second from the original film by repeating three times even film frames and two times odd film frames (2 to 3 pull down ratio). In skip-2 recording one out of every three film chain fields is selected and recorded and then repeated three times in playback, thus obtaining an actual 20 images per second rate. Therefore, in one second, 4 out of 24 frames of the original film will be skipped, i.e., one out of six film frames will not be recorded and 4 Hz staccto will be present. How this occurs can be seen from the following chart where a, b, c, ... f represent the frames of the original film made at a 24 images per second rate:

| Film Frames | Film Chain TV Fields | Skip-2 Record | Skip-2 Playback | |
|---|---|---|---|---|
| a | a | a | a | |
| | a | | a | |
| b | b | | a | |
| | b | b | b | |
| | b | | b | |
| c | c | | b | |
| | c | c | c | |
| | d | | c | ¼Sec. |
| d | d | | c | |
| | d | d | d | |
| e | e | | d | |
| | e | | d | |
| f | f | f | f | |
| | f | | f | |
| | f | | f | |

As can be seen, the frame (*e*) disappears in the process.

A second problem presented by skip field recording is that of excessive visibility of the noise or grain of the original material. In standard television systems, random defects due to film grain or electronic noise are displayed on the screen for 1/60 second then replaced 1/60 second later by another noise display not necessarily correlated with the first one. In general, the visibility of such noise will not be excessive. However, in a skip-2 playback display, the same random noise or grain structure will be displayed three times as long and will make a greater impression on the human eye. The same effect occurs also for moire and other undesirable interferences.

A third disadvantage is interlace and transition flicker effects. Thus, in a conventional television system, a 30 Hz 2/1 interlace is obtained through a succession of even and odd fields, while in skip-2 systems, three odd fields follow three even fields. As it is mandatory to display in playback the information in the precise location where it was when recorded (in order to avoid vertical jitter effects) an optimum skip-2 system will exhibit a 10 Hz 2/1 interlace; 6 fields are then necessary in order to get a complete picture. The line structure will then become more obvious, as a given scanning lines display, even or odd, will be visible for 1/10 second instead of a 1/30 second for usual television systems.

Another undesirable effect occurs when a sharp diagonal line is observed by the television camera. Such a line is analyzed by the scanning system and replaced by a series of dots. These dots do not occupy the same location on even and odd fields. Their back and forth motion leads to a certain "flicker" impression to the viewer. Such an effect is quite acceptable at 30 Hz but becomes objectionable at 10 Hz when observed in a skip-2 playback mode.

SUMMARY OF THE INVENTION

According to the present invention, an apparatus and method are provided for reducing the effect of the disadvantages of skip field recording noted above without giving up the advantages that are available through the use of this technique. This is accomplished by assuring that no significant information present in the original material disappears during the recording process. More particularly, it assures in the case of a movie film that all film frame images are transferred to the recording process.

It is therefore an object of the present invention to provide an improved method of, and apparatus for, skip field recording.

It is also an object of the present invention to provide such a method and apparatus in which information from different fields is combined prior to recording to increase the information content of the signals recorded.

Briefly, the present invention contemplates the storage of one of the television fields which would normally be skipped in recording, combining the stored field with the following field in a given proportion, and recording the composite information resulting from such a combination as a single field in the skip field recorder.

The storage medium may be a delay line, a disc recorder, or the target area of a storage type television pick up tube, such as a vidicon; for film material such a storage may be obtained by multiple image printing. The type of storage used does not affect the principle of this invention, nor does the type of recording employed which, for example, may be magnetic, optical or disc recording.

In a preferred embodiment, a standard converter is used to perform the storage function required for improving the quality of skip recording. Standard conversion is effected by means of two interlocked electro-optical converters, one converting the luminance and the other the color, from a 50 Hz source (film) or a 60 Hz source (live or tape) on to a 60 Hz signal. Luminance and coded chroma input informations are displayed on two picture tubes and relayed by optical means to the face plates of two storage type pick-up tubes scanned in the 60 Hz output television standard.

During the basic 3-fields sequence characteristic of skip-2 recordings, the storage tube beams are switched off during the first field, on during the second field and on again during the third field scanning period. As the pick-up tubes targets are not allowed to be discharged during the first field, the information read out during the second field scanning period is the sum of field 1 and field 2 informations and it is this composite signal which is recorded by the skip-2 recorder.

DETAILED DESCRIPTION OF THE INVENTION

Figure 1:
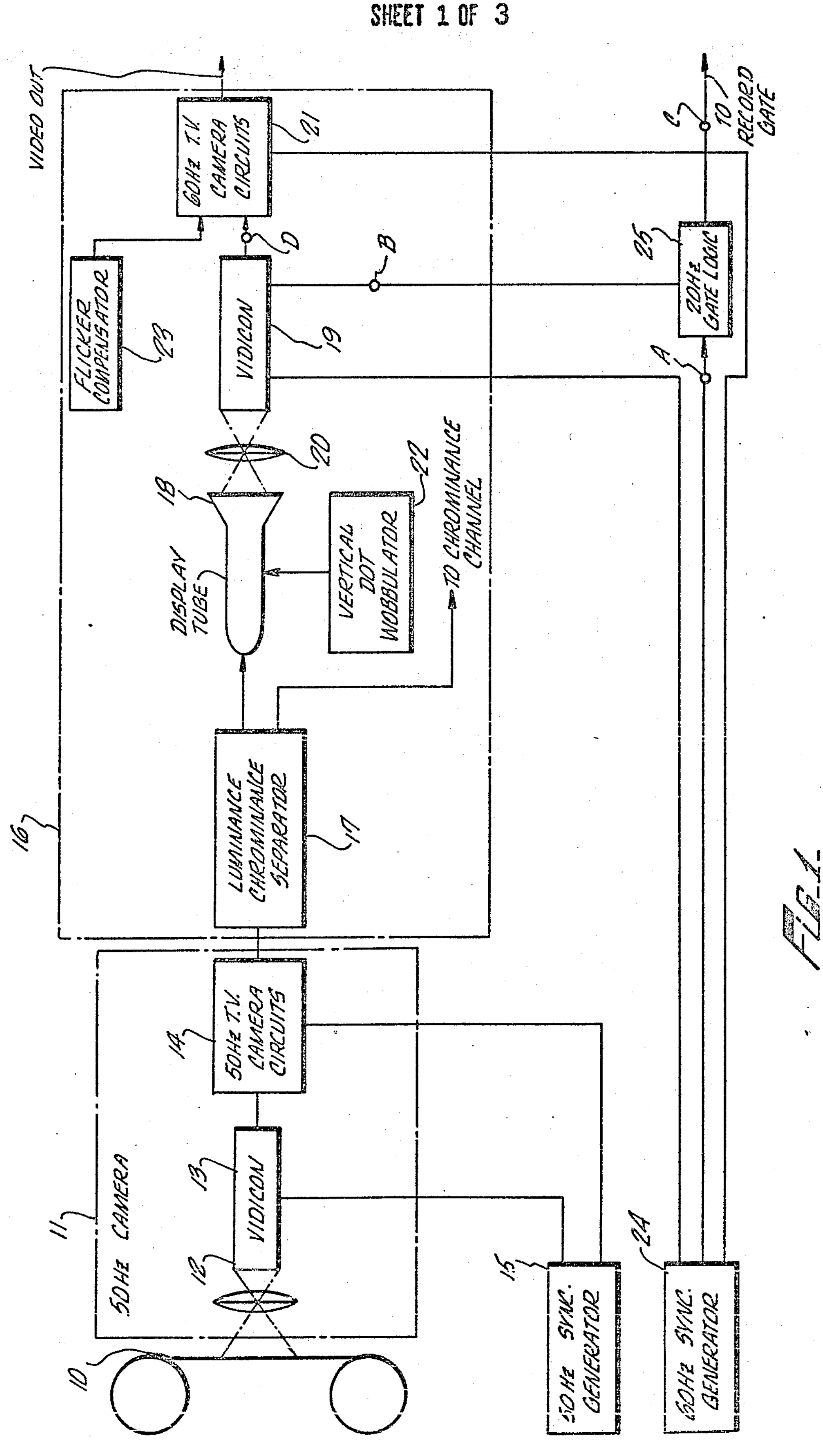
FIG. 1 is a schematic block diagram showing a preferred embodiment of the system of the present invention.
Figure 2:
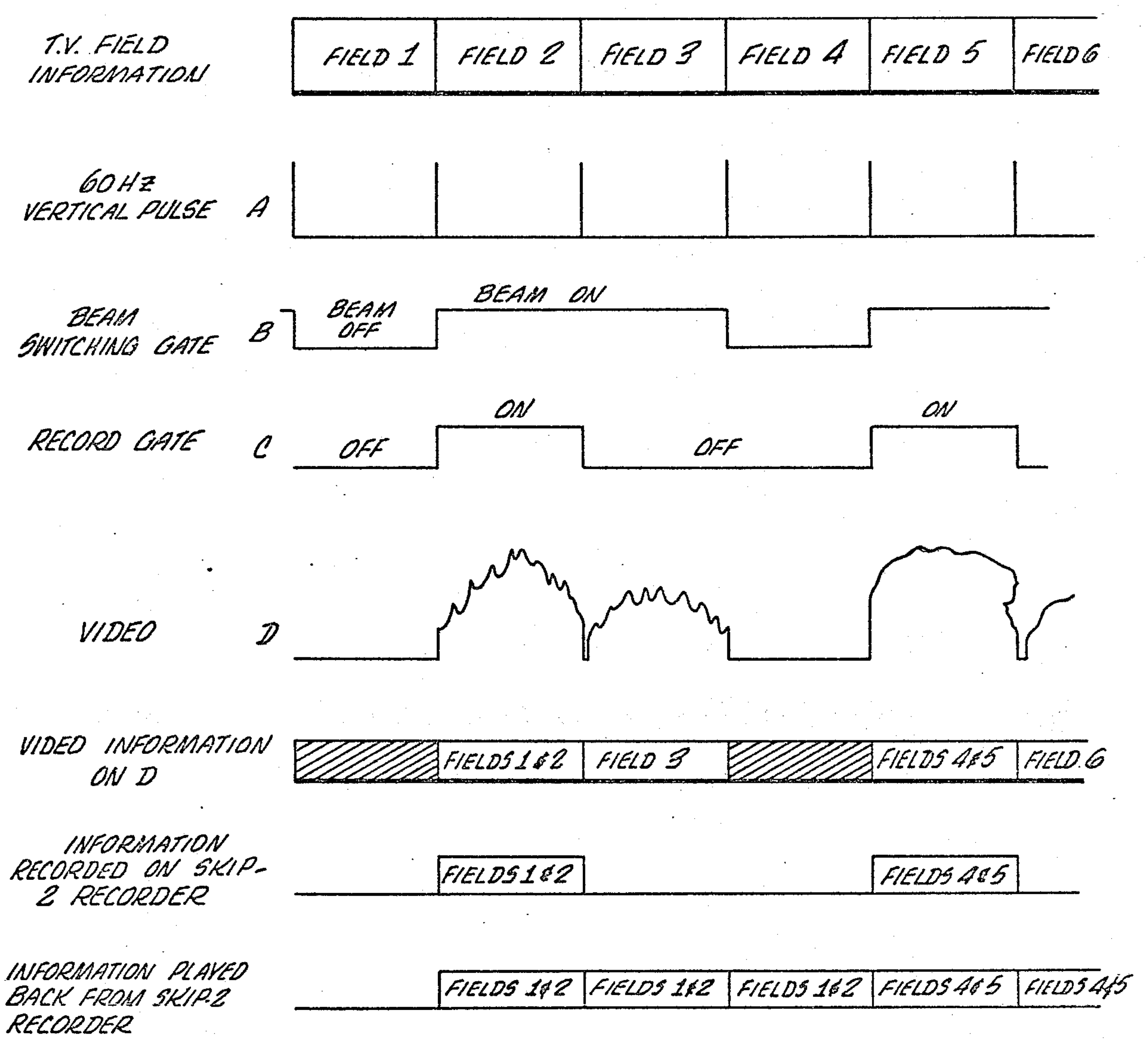
FIG. 2 is a timing diagram illustrating the operation of the present invention.

The basic principles of the present invention can best be understood by reference to FIGS. 1 and 2. As described, the method and apparatus of the present invention are employed in connection with skip-2 recording; it will be understood, however, that this description is illustrative only as the invention may equally well be employed in other skip field recording techniques.

Turning now to FIG. 1, the system of the present invention is illustrated in the context of recording a motion picture film. As all of the apparatus utilized is per se conventional in the art, only schematic representations are shown; these are believed sufficient to instruct one skilled in the art of the construction and operation of the present invention. A film 10 moving at 25 frames per second is converted into a PAL 50 Hz color television program by means of a conventional PAL television camera indicated generally at 11. Such a camera includes an objective lens 12, a pick-up or storage device 13, which may for example be a vidicon tube, and miscellaneous circuitry 14. The objective lens 12 relays the film frame images to the vidicon tube faceplate. The vidicon tube 13 may be, for example, of the "Plumbicon" (Philips trademark) type. Although only one vidicon tube is shown it should be understood that for color recording the camera 11 is in actuality composed of 3 interlocked vidicon tubes, one for each color. The camera is synchronized by a conventional 50 Hz PAL synchronization generator 15.

The PAL composite color television signal produced by camera 11 is then sent to a conventional color standards converter 16, such as the Fernseh Model NC56P40. Standards conversion is effected by means of two interlocked electro-optical converters similar to the one illustrated in FIG. 1, one of which converts the luminance signal, and the other, the chrominance signal. For this purpose, the signal from the camera 11 is first applied to a luminance-chrominance separator 17 which separates it into its two components. As shown, the monochrome signal component is then fed to a picture or display tube 18. The image on the tube 18 is read into a pick-up or storage device such as vidicon tube 19 by means of an objective lens 20. The output of the vidicon tube 19 is fed to the camera circuits 21.

The converter is further provided with a vertical dot wobbulator 22 which has for its function the elimination of scanning line visibility in the picture tubes, and with a flicker compensator 23 to eliminate 10 Hz light variation components resulting from a beat pattern between the input 50 Hz signal and the output 60 Hz signal. The converter is synchronized by a conventional NTSC synchronizing generator 24.

As illustrated the standards converter converts from a 50 Hz source to a 60 Hz standard when the material to be recorded is on film. It is, of course, also capable of converting from a 60 Hz source to another 60 Hz standard when the source is a live 60 Hz camera or a 60 Hz tape.

The conventional standards converter 16 thus far described is modified by the provision by means of switching on and off the target discharge beam of the pick-up tube or vidicon 19. These means take the form of 20 Hz gate logic 25 which receives an input from the sync generator 24 and provides a first output to the record gate to permit the recording of only every third field as is conventional in skip-2 recording and a second output which switches on or off the discharge beam in the vidicon 19 in a manner that will be apparent to those skilled in the art.

In operation, the gate logic 25 causes the beam of the vidicon tube 19 (and of course the corresponding vidicon tube in the chrominance channel) to be switched off during the first field, and switched on during the second and third scanning periods or fields. Since the target of the vidicon 19 is not allowed to be discharged during the first field, this field is stored in the tube and the second field superimposed over it. Consequently, the information read out during the second field scanning period is the composite or sum of first field and second field information and is recorded by the skip-2 recorder instead of just the first field information.

The operation of the system is further explained by reference to FIG. 2 which shows what occurs at the points A, B, C and D on the circuit of FIG. 1, as well as at the skip-2 recorder. This figure is believed to be self-explanatory and no detailed discussion is believed necessary. It need only be noted that the information recorded and played back is composite field information and thus has a greater information content than the single field information usually recorded by the skip-2 process.

Figure 3:
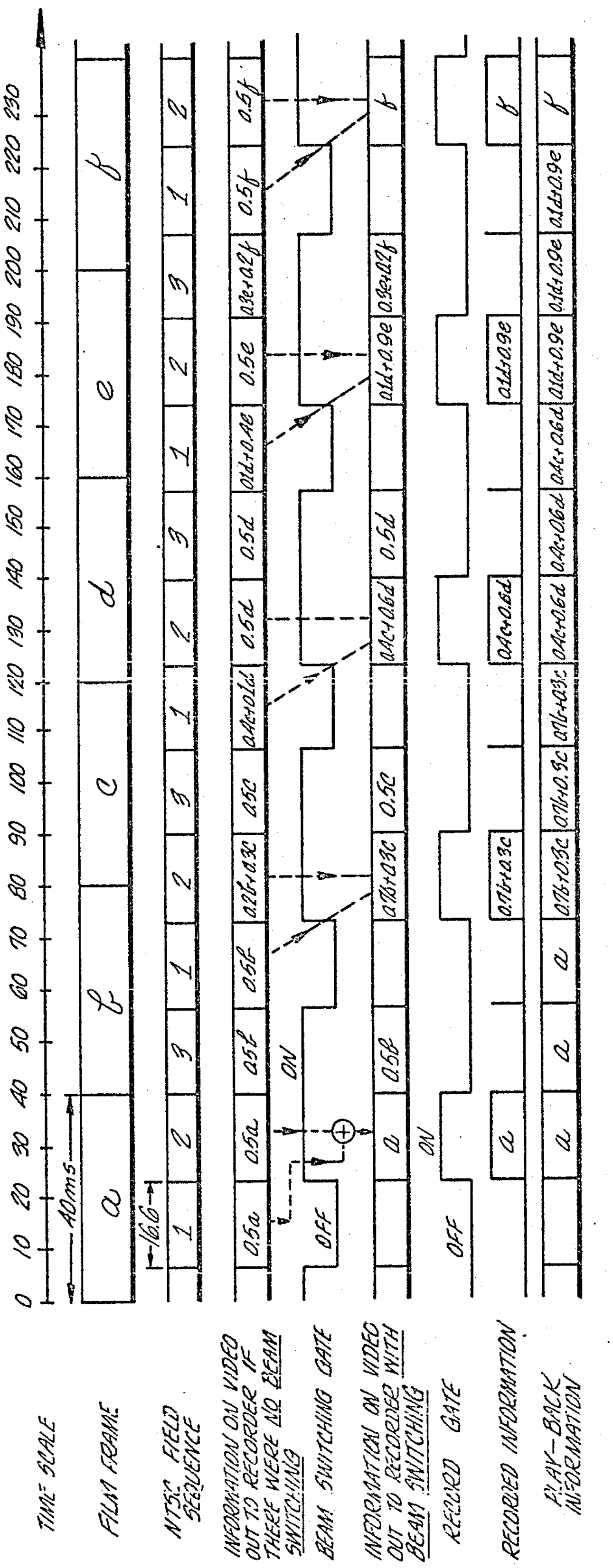
FIG. 3 is a block diagram illustrating the manner in which signal information to be recorded may be weighted in accordance with the present invention.
Figure 4:
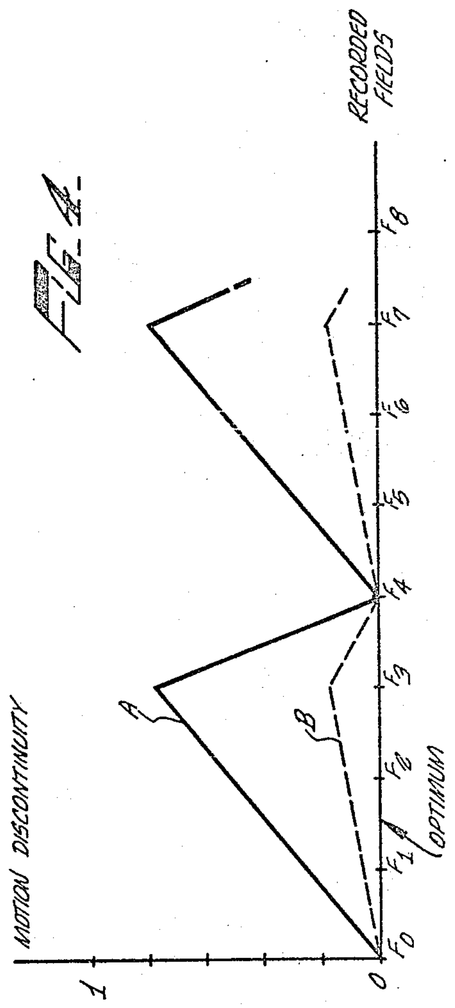
FIG. 4 is a graph illustrating the improvement in motion discontinuity made possible by use of the present invention.

The advantages of the present invention when applied to a specific application will be apparent from a consideration of the following example and by reference to FIGS. 3 and 4. In some instances it may be desirable that the effect of different viewed events be weighed, that is, that one event contribute more to the composite field signal produced in accordance with the present invention than does another event. Such is the case, for example, when a motion picture film is to be translated into a recorded television signal. By adding in variable proportions two successive film frames, it can be assured that not only will none of the film frames be skipped as happens in conventional skip field recording, but also that the staccato effect will be greatly reduced as to the eye of the viewer it will appear that the film frames are continuously faded from one frame to the next. This appearance results from the fact that the human eye is easily fooled and confuses the double image of a movable object with its average position.

To demonstrate the problem, let it be assumed that an object is supposed to cross the scene being viewed in six frames, i.e., it is supposed to sequentially appear at six different locations across the scene. As has been noted above, in conventional skip-2 recording, one of the frames will be lost and so the object will appear to jump discontinuously from the location represented by the film frame preceding the lost frame to the location represented by the frame succeeding the lost frame. To overcome this effect, it would be desirable to make the object appear at locations intermediate those represented by the film frames themselves so that its movement would appear smoother and more continuous. This problem can be illustrated by the following table:

| | 1 cycle | | | | | |
|---|---|---|---|---|---|---|
| Film frame | a | b | c | d | e | f |
| Successive location of a movable object (film) | 0 | 1 | 2 | 3 | 4 | 5 |
| Recorded fields | $F_0$ | $F_1$ | $F_2$ | $F_3$ | | $F_4$ |
| Optimum location on recorded fields | 0 | 1.25 | 2.5 | 3.75 | | 5 |
| Actual location | 0 | 1 | 2 | 3 | | 5 |
| Error | 0 | 0.25 | 0.5 | 0.75 | | 0 |

The location error is plotted as line "A" on FIG. 4.

According to the present invention it has been discovered that a table similar to that above can be established that greatly reduces the location error. This is accomplished by using the system of FIG. 1 and by proportionally weighing the film frames so that the recorded fields represent composite images that effectively place the object at locations that were equally spaced across the viewed scene. Thus, the present invention permits the recorded fields to be constructed as follows, assuming a 25 foot per second film frame rate:

| Recorded Field | Film Frame |
|---|---|
| $F_0$ | a |
| $F_1$ | 0.7b + 0.3c |
| $F_2$ | 0.4c + 0.6d |
| $F_3$ | 0.1d + 0.9e |
| $F_4$ | f |

The motion of the object can be illustrated by the following table:

| | 1 cycle | | | | | |
|---|---|---|---|---|---|---|
| Film frame | a | b | c | d | e | f |
| Successive location of a moving object (film) | 0 | 1 | 2 | 3 | 4 | 5 |
| Recorded fields | $F_0$ | $F_1$ | $F_2$ | $F_3$ | | $F_4$ |
| Optimum location for recorded fields | 0 | 1.25 | 2.5 | 3.75 | | 5 |
| Actual location with matrixing | 0 | 1.3 | 2.6 | 3.9 | | 5 |
| Error | 0 | 0.05 | 0.1 | 0.15 | | 0 |

As can be seen, the error is greatly reduced. This error is plotted as line B on FIG. 4. This line is, of course, much closer to the optimum than is the uncorrected line A and the difference between lines A and B represents the improvement in motion stability.

The foregoing analysis applies equally well to 24 f.p.s. film frame rate as to a 25 f.p.s. rate. It may, of course, be extrapolated to other film frame rates such as 16 or 18 f.p.s. by use of the system of FIG. 1. It should be understood that although a vidicon tube is shown as the storage device, other storage devices such as a video disc or a tape recorder could be used. The same effect can also be simulated by multiple film printing. In any event, the composite picture, resulting from the matrixing of two frames should keep the same intensity or video level throughout the cycle in order to avoid flicker.

FIG. 3 illustrates the manner in which the apparatus of FIG. 1 performs the matrixing just described. As can be seen, for a 25 frame per second film frame rate, the basic cycle of operation is 5 film frames, or 4 skip field record fields. The duration of the cycle is 200 milliseconds and all matrixing repeats itself every cycle. The figure is believed to be self-explanatory; however, a brief discussion may be helpful, keeping in mind that the composite signal recording will owe ½ of its information contents to each of the fields which make it up. As can be seen, the timing is such that the display of both fields 1 and 2 by display tube 18 will occur only during the presence in the film gate of frame *a*, with the result that the composite field signal produced by the vidicon tube 19 will reflect only frame *a* with 0.5 of this signal being contributed by field 1 and 0.5 of the signal being contributed by field 2. This composite field occurs during the record gate and is recorded. The next field, field 3, is not permitted to pass the record gate and so can be disregarded.

The next trio of fields must now be considered. Field 1 occurs during frame *b* so that the 50 percent of the composite signal it contributes can be seen to be equivalent to 0.5*b*. Frame 2, however, occurs during both frames *b* and *c*, 0.4 of the duration of field 2 occurring during frame *b* and 0.6 occurring during frame *c*. It can thus be seen that the 50 percent contribution of field 2 to the composite field signal is 0.2*b* and 0.3*c*. The composite field signal is thus made up of 0.5 *b* + (0.2 *b* + 0.3 *c*) or 0.7 *b* + 0.3 *c*. This is the signal composition shown by the table above to be desirable. As this composite field signal occurs during the record gate it is recorded. The remainder of the cycle follows in the same fashion and need not be described.

It can be seen from the foregoing that the method and apparatus of the present invention provides a skip field recording technique markedly superior to that of the prior art, and provides the following advantages:

1. Staccato reduction as described in connection with FIGS. 3 and 4.

2. Reduction of film grain visibility as most of the recorded fields are the result of an addition of two successive film frames. When such an addition is performed, the signal to noise ratio of the resulting TV picture is enhanced as information (repeated nearly identically) adds linearly while grain (uncorrelated from frame to frame) adds quadratically. This is also true for moire patterns and other undesired random interference, and is also true if the source is a tape or live camera.

3. Reduction of line interlace and transition flicker effects. Due to the vertical dot wobbulation of the converter display tubes and to the storage in the vidicons of two succesive fields of different parities, the information displayed during odd or even fields is identical. Perfect 30 Hz two to one interlace is possible in playback without undesired vertical jitter as odd and even picture information is identical. Transition flicker will also disappear as the dots resulting from the sampling of a diagonal line by the TV scanning do not essentially differ in location between odd and even fields.

It should be understood that although the present invention has been described in connection with a skip-2 recording process it could equally well be used with other skip field recording processes such as skip-1. In that case, the vidicons in the converter would have their scanning beams switched off during the first field and on during the second field so that the information read out during the second scanning period would be a composite of field 1 and field 2 information. It should also be understood that different storage devices other than those described could be used and that the invention is not confined to any particular recording device. The foregoing description in all particulars should thus be considered as illustrative only and not restrictive or limiting of the true scope of the invention.

What is claimed is:

1. The method of skip field recording wherein certain ones of a plurality of successive individual video signals are recorded as composite video signals, the individual video signals not being recorded, comprising the steps of;

producing a multitude of successive series of video signals, each series comprising a plurality of individual video signals, combining certain ones of said plurality of individual video signals in each series into a composite video signal, and recording each of the successive composite video signals on a recording medium, the individual video signals in each series being unrecorded.

2. The method as claimed in claim 1 wherein the step of combining certain ones of said plurality of video signals in each series into a composite video signal comprises the step of storing one video signal which is first in time and thereafter combining said stored video signal with another video signal which is later in time.

3. The method as claimed in claim 1 including the step of producing said multitude of successive series of video signals from movie film.

4. The method of skip field recording wherein certain ones of a plurality of successive video signals are recorded and certain others of said video signals are skipped and not recorded comprising the steps of:

producing a multitude of successive series of video signals, each series comprising a plurality of video signals, combining certain ones of said plurality of video signals in each series into a composite video signal, and recording each of the successive composite video signals on a recording medium, certain other ones of the video signals in each series being unrecorded.

5. The method as claimed in claim 4 wherein the step of combining certain ones of said plurality of video signals in each series into a composite video signal comprises the step of storing one video signal which is first in time and thereafter combining said stored video signal with another video signal which is later in time.

6. The method as claimed in claim 4 including the step of producing said multitude of successive series of video signals from movie film.

7. The method of skip field recording wherein certain ones of a plurality of successive video signals are recorded and certain others of said video signals are skipped and not recorded comprising the steps of;

producing a multitude of successive series of video signals, each series comprising first, second, and third video signals, combining the first and second video signals in each series into a composite video signal, and recording each of the successive composite video signals on a recording medium while not recording each of said third video signals in each series.

8. The method as claimed in claim 7 wherein the step of combining certain ones of said plurality of video signals in each series into a composite video signal comprises the step of storing one video signal which is first in time and thereafter combining said stored video signal with another video signal which is later in time.

9. The method as claimed in claim 7 including the step of producing said multitude of successive series of video signals from movie film.

10. A skip field recording system wherein certain ones of a plurality of successive individual video signals are recorded as composite video signals, the individual video signals not being recorded, comprising:

means for producing a plurality of successive series of video signals, each series comprising a plurality of individual video signals, means for combining certain ones of said plurality of individual video signals in each series into a composite video signal, and means for recording each of the successive composite video signals on a recording medium, the individual video signals in each series being unrecorded.

11. A skip field recording system as claimed in claim 10 wherein the means for combining certain ones of said plurality of video signals in each series into a composite video signal comprises means for storing one video signal which is first in time and thereafter combining said stored video signal with another video signal which is later in time.

12. A skip field recording system as claimed in claim 10 wherein said means for producing said multitude of successive series of video signals comprises means for producing said video signals from movie film.

13. A skip field recording system wherein certain ones of a plurality of successive video signals are recorded and certain others of said video signals are skipped and not recorded comprising;

means for producing a multitude of successive series of video signals, each series comprising a plurality of video signals, means for combining certain ones of said plurality of video signals in each series into a composite video signal, and means for recording each of the successive composite video signals on a recording medium, certain other ones of the video signals in each series being unrecorded.

14. A skip field recording system as claimed in claim 13 wherein the means for combining certain ones of said plurality of video signals in each series into a composite video signal comprises means for storing one video signal which is first in time and thereafter combining said stored video signal with another video signal which is later in time.

15. A skip field recording system as claimed in claim 13 wherein said means for producing said multitude of successive series of video signals comprises means for producing said video signals from movie film.

16. A skip field recording system wherein certain ones of a plurality of successive video signals are recorded and certain others of said video signals are skipped and not recorded comprising;

means for producing a plurality of successive series of video signals, each series comprising first, second, and third video signals, means for combining the first and second video signals in each series into a composite video signal, and means for recording each of the successive composite video signals on a recording medium while not recording each of said third video signals in each series.

17. A skip field recording system as claimed in claim 16 wherein the means for combining certain ones of said plurality of video signals in each series into a composite video signal comprises means for storing one video signal which is first in time and thereafter combining said stored video signal with another video signal which is later in time.

18. A skip field recording system as claimed in claim 16 wherein said means for producing said multitude of successive series of video signals comprises means for producing said video signals from movie film.

19. The method of recording film frame information in a skip field recording system wherein certain ones of a plurality of successive individual film frames are recorded as composite video signals comprising the steps of combining certain ones of said film frame information into composite signals, producing from these composite signals a multitude of successive series of video signals, each series comprising a plurality of video signals, and recording certain ones of said plurality of video signals on a recording medium in a skip field recording system.

* * * * *